(12) United States Patent
Sugiyama et al.

(10) Patent No.: US 8,995,720 B2
(45) Date of Patent: Mar. 31, 2015

(54) INFORMATION PROCESSING DEVICE, INFORMATION PROCESSING METHOD, AND NON-TRANSITORY COMPUTER READABLE STORAGE MEDIUM

(71) Applicant: Sony Computer Entertainment Inc., Tokyo (JP)

(72) Inventors: Hajime Sugiyama, Kanagawa (JP); Naofumi Ito, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 167 days.

(21) Appl. No.: 13/713,151

(22) Filed: Dec. 13, 2012

(65) Prior Publication Data

US 2013/0251196 A1 Sep. 26, 2013

(30) Foreign Application Priority Data

Mar. 22, 2012 (JP) .................................. 2012-066258

(51) Int. Cl.
*G06K 9/00* (2006.01)
*G06K 9/46* (2006.01)
*G06T 19/00* (2011.01)
*H04N 5/225* (2006.01)

(52) U.S. Cl.
CPC .. *G06K 9/46* (2013.01); *G06T 19/00* (2013.01)
USPC ........................................... 382/103; 348/169

(58) Field of Classification Search
CPC ....................................................... G06K 9/00
USPC .................. 382/103, 236; 348/169–172, 352
See application file for complete search history.

(56) References Cited

U.S. PATENT DOCUMENTS 6,885,371 B2 * 4/2005 Chang .......................... 345/427

* cited by examiner

*Primary Examiner* — Abolfazl Tabatabai
(74) *Attorney, Agent, or Firm* — Katten Muchin Rosenman LLP

(57) ABSTRACT

A non-transitory information storage medium stores a program for causing a computer to execute processing including obtaining a search region for a search of the outside of one object and selecting any object in the search region as a search result from among a plurality of other objects.

7 Claims, 4 Drawing Sheets

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATION

The present application claims priority from Japanese application JP2012-066258 filed on Mar. 22, 2012, the content of which is hereby incorporated by reference into this application.

BACKGROUND OF THE INVENTION

1. Field of the Invention

The present invention relates to an information processing device, an information processing method, and a computer readable storage medium.

2. Description of the Related Art

There has been available a technique for real-time generation of a 3D image which represents an object placed in a virtual space and acting. Further, it has been conducted a search for a wall or the like placed around an object to change a next action of the object based on a result of the search.

Raycasting is a method for searching for a wall or the like around. According to the raycasting, a plurality of rays are virtually casted using the position of an eye or the like of the object as a start point to obtain a cross point between each ray and a surface of the object around.

SUMMARY OF THE INVENTION

In a search for an object, such as a wall or the like around, using raycasting, only a cross point located ahead of the ray being casted is detected. Therefore, an increased amount of calculation is required to improve, for example, accuracy in the search due to an increased number of rays. Further, difficulty in pre-setting of other conditions for detecting a cross point makes program development complicated as further requiring logic for determination of a relationship between a cross point and an object, using a result of raycasting.

The present invention has been conceived in view of the above, and an object thereof is to provide a technique capable of searching for an object or the like around an object in a more reliable and flexible manner than a search method using raycasting.

In order to achieve the above described object, according to an exemplary embodiment of the present invention, there is provided a non-transitory information storage medium storing a program for causing a computer to execute processing including obtaining a search region for a search of outside of one object; and selecting any object in the search region as a search result from among a plurality of other objects.

Further, according to an exemplary embodiment of the present invention, there is provided an information processing device, including a search region obtaining unit for obtaining a search region for a search of outside of one object; and a selection unit for selecting any object in the search region as a search result from among a plurality of other objects.

Further, according to an exemplary embodiment of the present invention, there is provided an information storage method, including: a step of obtaining a search region for a search of outside of one object; and a step of selecting any object in the search region as a search result from among a plurality of other objects.

According to the present invention, it is possible to search for an object around another object in a more reliable and flexible manner, compared to a search method using raycasting.

In the exemplary embodiment of the present invention, the processing for selecting any object may include selecting any element in the search region as the search result from among a plurality of elements constituting surfaces of the plurality of other objects.

In the exemplary embodiment of the present invention, the processing for selecting any object may include selecting a point as the search result from a region that is contained in any element in the search region among the plurality of elements constituting the surfaces of the plurality of other objects.

In the exemplary embodiment of the present invention, the processing for selecting any object may include selecting a point as the search result from a region that is contained in any element in the search region and also contained in the search region among the plurality of elements constituting the surfaces of the plurality of other objects.

In the exemplary embodiment of the present invention, the program may cause the computer to further execute processing for extracting one or more elements in the search region from among the plurality of elements constituting the surfaces of the plurality of other objects, and the processing for selecting any object may include selecting an element as the search result from among the elements extracted.

In the exemplary embodiment of the present invention, the element may include a polygon. Further, the program may cause the computer to further execute processing for obtaining a condition of a normal to a polygon being a search target, and the processing for extracting one or more elements may include extracting one or more polygons in the search region from among the plurality of elements based on the condition of a normal.

In the exemplary embodiment of the present invention, the program may cause the computer to further execute processing for obtaining a condition of an attribute of an element being a search target, and the processing for extracting one or more elements may include extracting one or more elements in the search region from among the plurality of elements based on the condition of an attribute.

In the exemplary embodiment of the present invention, the program may cause the computer to further execute processing for moving at least a part of the one object, based on the search result.

In the exemplary embodiment of the present invention, the processing for obtaining the search result may include obtaining a search region for a search of outside of the one object based on a state of the one object.

DETAILED DESCRIPTION OF THE INVENTION

Figure 1:
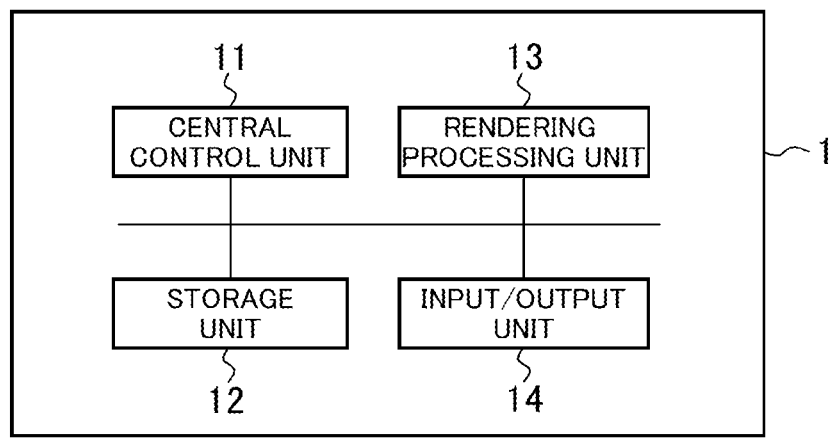
FIG. 1 shows one example of a structure of an image generating device according to an embodiment of the present invention.

In the following, an embodiment of the present invention will be described, based on the drawings. Structural members having a similar function are given the same reference numerals, with a description thereof not repeated.

FIG. 1 shows a structure of an image generating device 1 according to an embodiment of the present invention. The image generating device 1 includes a central control unit 11, a storage unit 12, a rendering processing unit 13, and an input/output unit 14. The image generating device 1 is a device, such as, for example, a personal computer, a consumer game device, or the like, that has a function for generating a 3D image.

The central control unit 11 operates according to a program stored in the storage unit 12, and controls the rendering processing unit 13 and the input/output unit 14. The above mentioned program may be provided as being stored in a computer readable storage medium, such as a DVD-ROM, a flash memory, or the like, or via a network, such as the Internet or the like.

The storage unit 12 includes a memory device, such as a RAM, a ROM, and a hard disk drive, or the like. The storage unit 12 stores the above mentioned program. The storage unit 12 stores information and operation results input from the respective units.

The rendering processing unit 13 has a function for executing arithmetic operations in parallel according to a program stored in the storage unit 12 and a function for rending a 2D image, based on information describing a surface of a 3D object. The rendering processing unit 13 outputs a result of operation to the storage unit 12 and/or to the input/output unit 14.

The input/output unit 14 includes a part for controlling a display output device, such as a monitor, an input device, such as a mouse or the like. The input/output unit 14 outputs image data or the like, generated by the rendering processing unit 13 or the like to a display output device under control by the central control unit 11. The input/output unit 14 obtains information from an operator (a user) via the input device.

Figure 2:
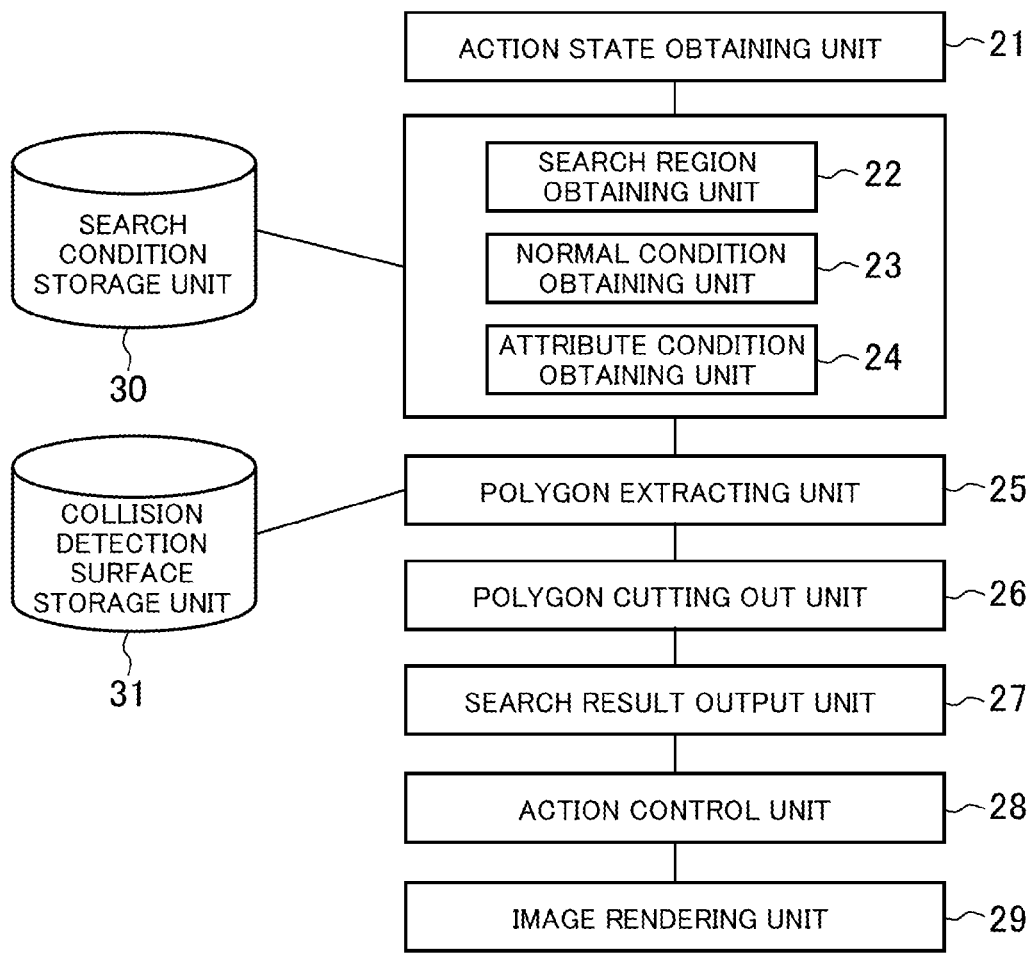
FIG. 2 shows a functional block of the image generating device according to the embodiment of the present invention.

FIG. 2 shows functional blocks of the image generating device 1 according to the embodiment of the present invention. The image generating device 1 functionally includes an action state obtaining unit 21, a search region obtaining unit 22, a normal condition obtaining unit 23, an attribute condition obtaining unit 24, a polygon extracting unit 25, a polygon cutting out unit 26, a search result output unit 27, an action control unit 28, an image rendering unit 29, a search condition storage unit 30, and a collision detection surface storage unit 31. These functions are implemented by the central control unit 11 or the rendering processing unit 13 by executing a program stored in the storage unit 12 to control the input/output unit 14 or the like. Note that although only the central control unit 11 among the central control unit 11 and the rendering processing unit 13 is referred to as executing the processing in the following description on the respective functions, the rendering processing unit 13 may execute a part of the processing. A developer may arbitrarily allocate parts of the processing to the central control unit 11 and the rendering processing unit 13, depending on a characteristic of the parts of the processing concerned at the stage of program development.

Figure 3:
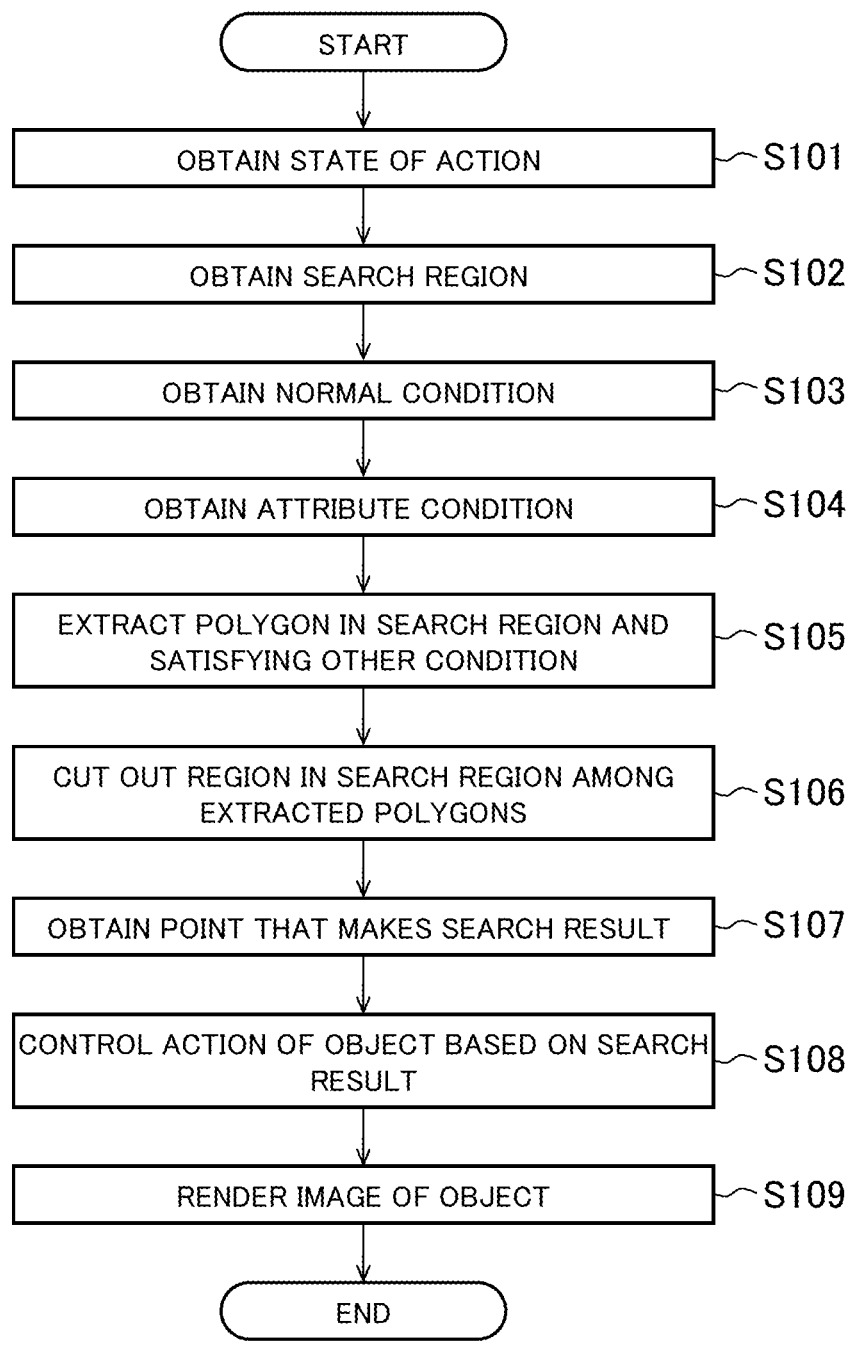
FIG. 3 shows one example of a processing flow of the image generating device according to the embodiment of the present invent ion.

FIG. 3 shows one example of a flow of processing by the image generating device 1 according to the embodiment of the present invention. In the following, a function of the image generating device 1 is described referring to the processing flow. Note that the processing flow shows processing executed in a frame, and that in actuality the processing shown in the processing flow is repetitively executed every change of frames.

The action state obtaining unit 21 is implemented, using mainly the central control unit 11, the storage unit 12, and the input/output unit 14. The action state obtaining unit 21 obtains a state of an object in a frame with ongoing processing (step S101). In the following, for distinction from other objects, the above mentioned object is referred to as a "self-object 40". The state of the self-object 40 includes, for example, the kind of an action thereof and a period of time elapsed after start of the action. Example kinds of the action may include "to walk", "to stand", "to sit", and so forth. An action of the self-object 40 (a position and a direction of a skeleton constituting the self-object 40) is stored in advance in the storage unit 12 so as to be correlated to one of the kinds of the action. Note that a direction in which the self-object 40 is moving and a relative position relative to the ground surface may be obtained as the state of an action of the self-object 40.

The search region obtaining unit 22 is implemented, using mainly the central control unit 11 and the storage unit 12. The search region obtaining unit 22 obtains a search region 51 (search volume) for a search of the outside of the self-object 40, based on the obtained state of the self-object 40 (step S102). The search region 51 is a 3D region.

Information that defines the search region 51 is stored in the search condition storage unit 30. The search condition storage unit 30 is implemented, using mainly the storage unit 12. The search condition storage unit 30 stores information that defines the search region 51, a condition of a normal (a normal condition) to a polygon 47 to be searched for (a search target polygon 47), and a condition of an attribute (an attribute condition) of the search target polygon 47 so as to be correlated to the state of an object, such as, for example, the kind of an action, a period of time elapsed, or the like.

Figure 4:
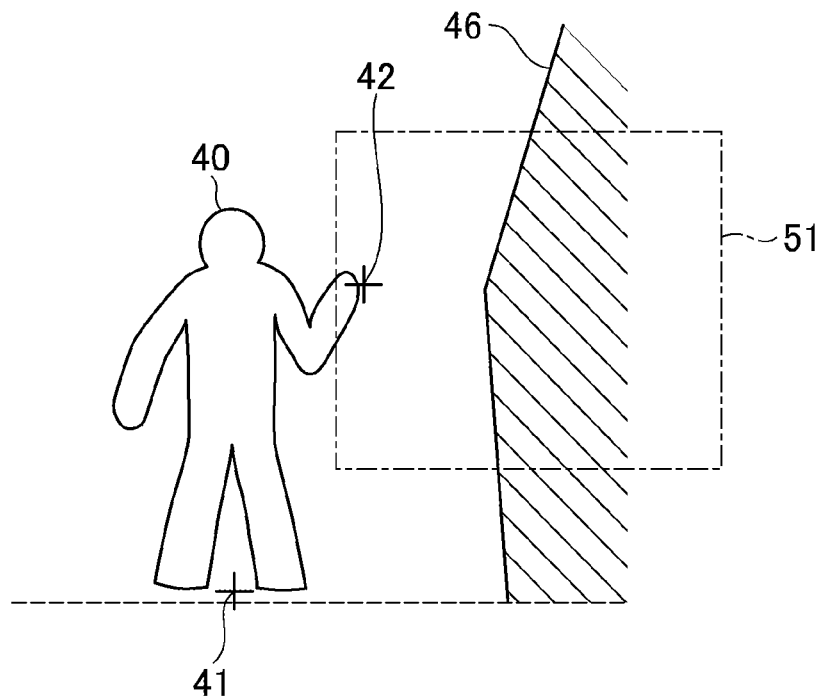
FIG. 4 shows one example of a self-object and a search region.

FIG. 4 shows one example of the self-object 40 and the search region 51. Information defining the search region 51 includes information describing the shape and size of the search region 51, information indicating an object start point 41 that constitutes a start point of the self-object 40 and information indicating a relative position according to the orientation of the self-object 40, and information indicating the position of a search start point 42 to be described later. In the example shown in FIG. 4, the search region 51 has a cuboids shape, and the information defining the search region 51 is relative position information of vertexes of the cubic of the search region 51 viewed from the object start point 41. The search condition storage unit 30 stores these information items so as to be correlated to the state of the object, such as the kind of an action, a period of time elapsed, and so forth.

Note that the example shown in FIG. 4 relates to a case in which another object, namely, a wall 46, in the search region 51 is searched for. A surface of the other object is constituted of a plurality of elements. The elements are used to detect a collision against an object different from the object that contains the element. Specifically, in the following, a case will be described in which the plurality of elements are a plurality of polygons 47. The collision detection polygon 47 may differ from a display polygon (mesh). The above described polygon 47 for use in collision detection is referred to as a collision mesh. An element that constitutes a surface of an object may be a curved surface constituting a surface in a geometrical shape.

The polygon 47 for use in collision detection is stored in the collision detection surface storage unit 31. The collision detection surface storage unit 31 is implemented, using mainly the storage unit 12. The collision detection surface storage unit 31 stores a polygon 47 that constitutes a collision detection surface of a fixed object, such as a wall or the like. As to a moving object, the surface storage unit 31 may store a positional relationship between a position of a skeleton that constitutes the object and the polygon 47 for collision detection. In the latter case, the polygon extracting unit 25 executes processing for calculating the position of the polygon 47 that constitutes the object before extracting the polygon 47 to be described later.

Thereafter, processing for obtaining a search condition for a search for an object in a search region is executed. In the following, a case will be described in which a normal condition and an attribute condition are used as the search condition.

The normal condition obtaining unit 23 is implemented, using mainly the central control unit 11 and the storage unit 12. The normal condition obtaining unit 23 obtains a normal condition to be satisfied by a search target polygon 47, based on the obtained state of the self-object 40 (step S103). The normal condition is defined using, for example, the coordinate system of the self-object 40. Details on the normal condition and relevant processing will be described later.

The attribute condition obtaining unit 24 is implemented, using mainly the central control unit 11 and the storage unit 12. The attribute condition obtaining unit 24 obtains an attribute condition to be satisfied by a search target polygon 47, based on the obtained state of the self-object 40 (step S104). Note here that an attribute of the polygon 47 is information for use in determining whether or not the polygon 47 is relevant to the state of an action of the self-object 40. For example, the attribute may be information, such as "a decayed board", "a dirty wall", "a rock", describing a characteristic of the object covered by the polygon 47. For example, an attribute condition in accordance with the state of the action is a list of attributes to be satisfied by the search target polygon 47. For example, in a search for a position to put a hand on in "an action of putting a hand on", exclusion of "a decayed board" and a "dirty wall" from the attribute conditions can prevent a case in which a hand is put on an object on which a hand would not normally be put.

Note that the search condition is not limited to those describe above. For example, the search target polygon 47, instead of an attribute, may be directly obtained as a search condition, depending on the state of the self-object 40. Further, when an element other than the polygon 47 is used, a search target element and/or an attribute condition may be obtained.

In the following, processing for obtaining an object in the search region as a search result from among a plurality of objects different from the self-object 40 will be described. Specifically, in the following, a case will be described in which an element that constitutes a surface of the object or a point contained in the element is selected as a search result, and the element is the polygon 47.

The polygon extracting unit 25 is implemented, using mainly the central control unit 11 and the storage unit 12. The polygon extracting unit 25 extracts one or more polygons 47 that is/are present in the search region 51 and satisfies/satisfy the normal condition and the attribute condition from among the plurality of polygons 47 constituting the surfaces of objects other than the self-object 40 (step S105). In the following, details on the extraction processing will be described.

Initially, the polygon extracting unit 25 finds all polygons 47 that are at least partially positioned in the search region 51. Thereafter, the polygon extracting unit 25 extracts a polygon 47 having a normal vector that satisfies the normal condition obtained by the normal condition obtaining unit 23 from among the polygons 47 found, and then outputs a polygon 47 having an attribute that satisfies the above mentioned attribute condition among the extracted polygons 47 as an extracted result.

Figure 5:
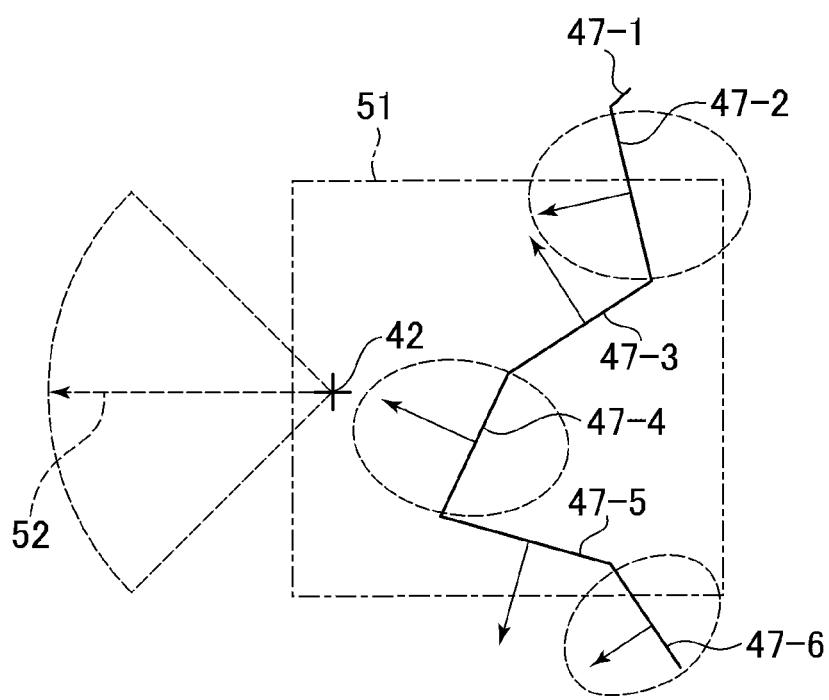
FIG. 5 shows one example of a search region, a normal condition, and a search target polygon.

FIG. 5 shows one example of the search region 51, the normal condition, and the search target polygon 47. The normal condition is defined by the direction of the central vector 52 and a range of an angle from the central vector 52, and a area defined by the range and the central vector has a cone-shape. In the example shown in FIG. 5, the polygon extracting unit 25 finds polygons 47-2, 47-3, 47-4, 47-5, 47-6 that are at least partially positioned in the search region 51, and then extracts polygons 47-2, 47-4, 47-6 that each have a normal extending in a direction within the range of the angle according to the above mentioned normal condition from among those polygons found. Further, a polygon that satisfies an attribute condition among the extracted polygons 47 is output.

Note that the polygon extracting unit 25 may exclude some of the attribute conditions and the normal conditions from conditions for extracting a polygon 47. For example, when necessary, a polygon not satisfying an attribute condition may be output as a search result, and a polygon not satisfying a normal condition may be output as a search result. Further, not only the polygon 47 but also an element constituting a surface having a different geometrical shape may be extracted.

The polygon cutting out unit 26 is implemented, using mainly the central control unit 11 and the storage unit 12. The polygon cutting out unit 26 cuts out a region in the search region 51 of the polygon 47 (or any other element, such as a curved surface or the like) extracted by the polygon extracting unit 25 (step S106). This processing is achieved by, for example, executing so-called Boolean processing between the search region 51 and the polygon 47 being an extracted result. In the example shown in FIG. 5, a region outside the search region 51 of the polygons 47-2, 47-6 is excluded from a target of subsequent processing.

The search result output unit 27 is implemented, using mainly the central control unit 11 and the storage unit 12. The search result output unit 27 selects a point from a region contained in an element, such as the polygon 47, and extracted and cut out, and outputs the point selected as a search result (step S107). Specifically, the search result output unit 27 selects a point positioned closest to the search start point 42 from a 2D region that is on the extracted polygon 47 and contained in the search region 51, in other words, a 2D region on the polygon 47, the region being cut out by the polygon cutting out unit 26. Note that a point may be selected not only from the polygon 47, but also from a frame (edge) of the polygon 47.

Note here that selection of a point may be considered as selection of an element, such as a polygon 47 or the like, having the point in the region thereof. Also note that the search result output unit 27 may output, instead of a point itself, a polygon 47 that contains the point as a search result. Further note that a point may be selected from the entire region of the polygon 47 extracted by the polygon extracting unit 25 without executing the processing by the polygon cutting out unit 26.

The search result output unit 27 may not necessarily select a point, based on the distance to the search start point 42. For example, the polygon extracting unit 25 may extract directly the search target polygon 47 obtained as a parameter by the polygon extracting unit 25, and the search result output unit 27 may select a cross point between the frame of the extracted polygon 47 and a surface constituting an outer edge of the search region 51.

Figure 6:
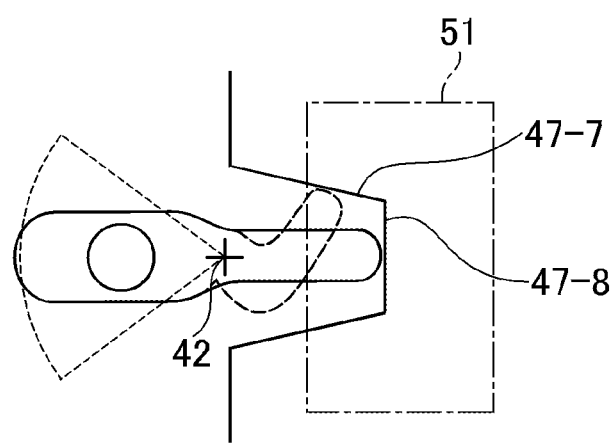
FIG. 6 shows one example of a relationship between a self-object and a normal to a polygon.

Note here that extraction of the polygon 47 based on a normal condition has an advantage in ensuring consistency with an action of the self-object 40. FIG. 6 shows one example of a relationship between the self-object 40 and a normal to the polygon 47. In the example shown in FIG. 6, when the self-object 40 performs an action of "putting its hand" on its right side, absence of consideration on the direction of the normal may result in selection of a point on a polygon 47-7 that does not face leftward as a target position on which to put its hand on. In such a case, the hand may be put on as indicated by the broken line in FIG. 6, which is not natural as an action of putting its hand on its right side. That is, use of a normal condition enables a more natural expression of the action as a point on the polygon 47-8 is selected.

According to this search method, as a geometrical shape of an element constituting a surface of an object is used for selecting a point or the like, change in the calculation amount due to difference in obtaining accuracy is smaller, compared to a case using raycasting. Further, there is no possibility of making erroneous determination that could be made in a case using raycasting due to presence of a small polygon 47 between rays. Therefore, a smaller processing load is resulted, compared to a case using raycasting, which requires increased intensity of the number of rays, when an improved accuracy over a certain level is desired. Further, as the shape of an object surface is directly dealt with, it is possible to achieve flexible search using a condition deeply related to a shape, such as, for example, a normal or a frame of a polygon. Still further, easiness in obtaining information on a surface in the search region 51 and information on the position of the surface can facilitate subsequent processing.

The action control unit 28 is implemented, using mainly the central control unit 11 and the storage unit 12. The action control unit 28 controls an action of the self-object 40, based on a search result (step S108). When the self-object 40 is in a state, such as, for example, the state of standing, that assumes a next action to be an action of putting a hand on, the action control unit 28 causes the self-object 40 to start the action of putting a hand on, beginning with the next frame, once a point that makes a search result is found in the search region 51. Further, when an action of putting a hand on has already been started, processing for having the position of the tip end of the hand to get closer to the search result point is then executed.

The image rendering unit 29 is implemented, using mainly the central control unit 11, the rendering processing unit 13, the storage unit 12, and the input/output unit 14. The image rendering unit 29 renders an image of an object, using the rendering processing unit 13 (step S109), and outputs a signal of the image to the display output device so that the display output device outputs the image rendered. More specifically, the image rendering unit 29 obtains information on the position of skeletons that constitutes each object in accordance with an action of the object determined in the processing so far, then simulates a physical behavior of the object, using a rag doll corresponding to the skeletons. Further, the image rendering unit 29 modifies the position of the skeletons, based on the result of simulation, and renders an image of the object through processing by a so-called rendering engine. In the rendering, a polygon 47 (skin mesh) representing a surface of the object and correlated to the position of each skeleton is used.

What is claimed is:

1. A non-transitory information storage medium storing a program for causing a computer to execute processing comprising:
   obtaining a search region for a search of outside of one object; and
   selecting any object in the search region as a search result from among a plurality of other objects,
   wherein the processing for selecting any object comprises selecting any element in the search region as the search result from among a plurality of elements constituting surfaces of the plurality of other objects,
   the program causes the computer o further execute processing for extracting one or more elements in the search region from among the plurality of elements constituting the surfaces of the plurality of other objects, and
   the processing for selecting any object comprises selecting an element as the search result from among the elements extracted.

2. The non-transitory information storage medium according to claim 1, wherein
   the element includes a polygon,
   the program causes the computer to further execute processing for obtaining a condition of a normal to a polygon being a search target, and
   the processing for extracting one or more elements comprises extracting one or more polygons in the search region from among the plurality of elements based on the condition of a normal.

3. The non-transitory information storage medium according to claim 1, wherein
   the program causes the computer to further execute processing for obtaining a condition of an attribute of an element being a search target, and
   the processing for extracting one or more elements comprises extracting one or more elements in the search region from among the plurality of elements based on the condition of the attribute.

4. The non-transitory information storage medium according to claim 1, wherein the program causes the computer to further execute processing for moving at least a part of the one object, based on the search result.

5. The non-transitory information storage medium according to claim 1, wherein the processing for obtaining the search result comprises obtaining a search region for a search of outside of the one object based on a state of the one object.

6. An information processing device, comprising:
   search region obtaining means for obtaining a search region for a search of outside of one object; and
   selection means for selecting any object in the search region as a search result from among a plurality of other objects,
   wherein the selection means for selecting any object comprises:
   selecting any element in the search region as the search result from among a plurality of elements constituting surfaces of the plurality of other objects,
   extracting one or more elements in the search region from among the plurality of elements constituting the surfaces of the plurality of other objects, and
   selecting an element as the search result from among the elements extracted.

7. An information storage method, comprising:
   a step of obtaining a search region for a search of outside of one object; and
   a step of selecting any object in the search region as a search result from among a plurality of other objects;

wherein the step of selecting any object comprises:
  selecting any element in the search region as the search result from among a plurality of elements constituting surfaces of the plurality of other objects,
  extracting one or more elements in the search region from among the plurality of elements constituting the surfaces of the plurality of other objects, and
  selecting an element as the search result from among the elements extracted.

* * * * *